US012801999B2

(12) United States Patent
Stewart et al.

(10) Patent No.: US 12,801,999 B2

(45) Date of Patent: Nov. 17, 2026

(54) TRAINING REGRESSION MODELS USING TRUTH SET DATA PROXIES

(71) Applicant: Daash Intelligence, Inc., Miami, FL (US)

(72) Inventors: Justin T. Stewart, New York, NY (US); Philip M. Smolin, Redwood City, CA (US); Melissa S. Munnerlyn, New York, NY (US); Liam N. Isaacs, Menlo Park, CA (US); Phillip J. Markert, Flowery Branch, GA (US); Vinoad Senguttuvan, New York, NY (US)

(73) Assignee: Daash Intelligence, Inc., Miami, FL (US)

( * ) Notice: Subject to any disclaimer, the term of this patent is extended or adjusted under 35 U.S.C. 154(b) by 385 days.

(21) Appl. No.: 18/645,222

(22) Filed: Apr. 24, 2024

(65) Prior Publication Data

US 2024/0362538 A1 Oct. 31, 2024

Related U.S. Application Data

(60) Provisional application No. 63/499,103, filed on Apr. 28, 2023.

(51) Int. Cl.
*G06N 20/00* (2019.01)

(52) U.S. Cl.
CPC .................................... *G06N 20/00* (2019.01)

(58) Field of Classification Search
None
See application file for complete search history.

(56) References Cited

U.S. PATENT DOCUMENTS

2020/0319851 A1* 10/2020 Rhisheekesan ....... G06F 7/4988
2021/0295204 A1* 9/2021 Bhide ...................... G06N 5/04
2022/0093261 A1* 3/2022 Noshay .................. G16H 20/40
2023/0316156 A1* 10/2023 Kim ..................... G06N 3/0442
706/12

FOREIGN PATENT DOCUMENTS

JP 7231012 B2 * 3/2023 ............... G06N 5/01

* cited by examiner

*Primary Examiner* — Mehmet Yesildag

(74) *Attorney, Agent, or Firm* — STETINA GARRED BRUCKER & NEWBOLES

(57) ABSTRACT

A method of training a machine learning regression model includes defining a prediction accuracy grading function, the prediction accuracy grading function being a many-to-one function that maps prediction accuracies to proxies, each of the prediction accuracies being derivable from a respective prediction of the model and a corresponding actual. The method may further include receiving a plurality of proxies corresponding respectively to a plurality of predictions of the model and, for each of the plurality of proxies, deriving a corresponding approximated actual according to the prediction accuracy grading function. The method may further include calculating an approximated residual for each of the plurality of predictions of the model based on the corresponding approximated actual and adjusting the model based on the approximated residuals.

14 Claims, 4 Drawing Sheets

TRAINING REGRESSION MODELS USING TRUTH SET DATA PROXIES

CROSS-REFERENCE TO RELATED APPLICATIONS

This application claims the benefit of U.S. Provisional Application No. 63/499,103, filed Apr. 28, 2023 and entitled "TRAINING REGRESSION MODELS USING TRUTH SET DATA PROXIES," the entire contents of which is expressly incorporated by reference herein.

STATEMENT RE: FEDERALLY SPONSORED RESEARCH/DEVELOPMENT

Not Applicable

BACKGROUND

Traditional machine learning based regression models require the application of truth set data ("actuals") for training the model and increasing predictive accuracy. However, in some environments, a technical, regulatory, or legal constraint may impose a firewall or otherwise prohibit the availability of actuals for training the model. As a result, there are many areas where regression models would be useful but cannot be taken advantage of by conventional methods.

BRIEF SUMMARY

The present disclosure contemplates various systems and methods for overcoming the above drawbacks accompanying the related art. One aspect of the embodiments of the present disclosure is a method of training a machine learning regression model. The method may comprise defining a prediction accuracy grading function, the prediction accuracy grading function being a many-to-one function that maps prediction accuracies to proxies, each of the prediction accuracies being derivable from a respective prediction of the model and a corresponding actual. The method may further comprise receiving a plurality of proxies corresponding respectively to a plurality of predictions of the model and, for each of the plurality of proxies, deriving a corresponding approximated actual according to the prediction accuracy grading function. The method may further comprise, for each of the plurality of predictions of the model, calculating an approximated residual based on the corresponding approximated actual. The method may further comprise adjusting the model based on the approximated residuals.

Another aspect of the embodiments of the present disclosure is a computer program product comprising one or more non-transitory program storage media on which are stored instructions executable by one or more processors or programmable circuits to perform operations for training a machine learning regression model. The operations may comprise defining a prediction accuracy grading function, the prediction accuracy grading function being a many-to-one function that maps prediction accuracies to proxies, each of the prediction accuracies being derivable from a respective prediction of the model and a corresponding actual. The operations may further comprise receiving a plurality of proxies corresponding respectively to a plurality of predictions of the model and, for each of the plurality of proxies, deriving a corresponding approximated actual according to the prediction accuracy grading function. The operations may further comprise, for each of the plurality of predictions of the model, calculating an approximated residual based on the corresponding approximated actual. The operations may further comprise adjusting the model based on the approximated residuals.

Another aspect of the embodiments of the present disclosure is a system for training a machine learning regression model. The system may comprise one or more databases for storing a prediction accuracy grading function, the prediction accuracy grading function being a many-to-one function that maps prediction accuracies to proxies, each of the prediction accuracies being derivable from a respective prediction of the model and a corresponding actual. The system may further comprise one or more computers operable to receive a plurality of proxies corresponding respectively to a plurality of predictions of the model and, for each of the plurality of proxies, derive a corresponding approximated actual according to the prediction accuracy grading function. The one or more computers may be further operable to calculate an approximated residual for each of the plurality of predictions of the model based on the corresponding approximated actual and to adjust the model based on the approximated residuals.

The system may further comprise one or more remote computers operable to receive the plurality of predictions of the model and a corresponding plurality of actuals, derive prediction accuracies from the predictions and the actuals, and map the prediction accuracies to proxies according to the prediction accuracy grading function to generate the plurality of proxies.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The present disclosure encompasses various embodiments of systems and methods for training a machine learning based regression model, especially under circumstances in which truth set data is unavailable. The detailed description set forth below in connection with the appended drawings is intended as a description of several currently contemplated embodiments and is not intended to represent the only form in which the disclosed subject matter may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
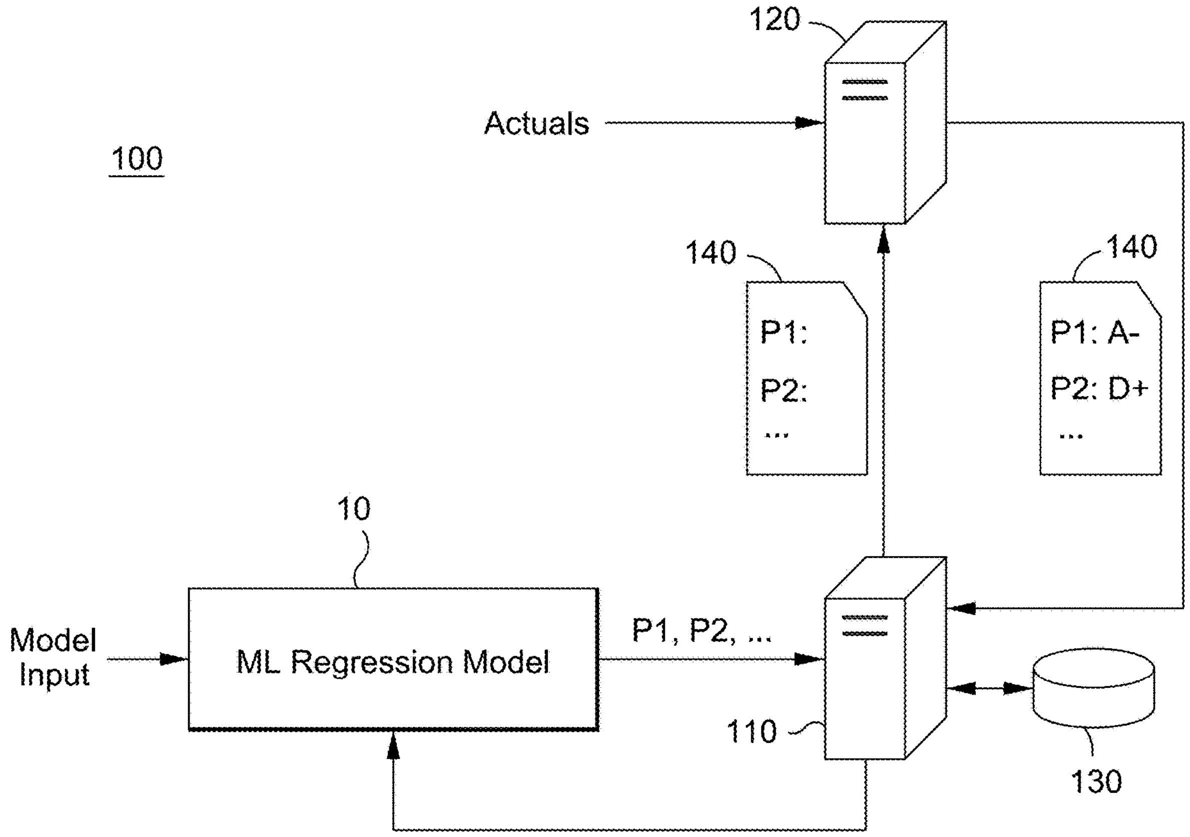
FIG. 1 shows an example machine learning regression model along with a system for training the model in accordance with various embodiments of the disclosed subject matter.

FIG. 1 shows an example machine learning regression model 10 along with a system 100 for training the model 10 in accordance with various embodiments of the disclosed subject matter. In general, the model 10 may receive some model input, which may include values of a plurality of features relevant to making a prediction. Based on the values of the features, the model 10 may output predictions P1, P2, etc. respectively for each set of feature values. In the case of training data, i.e., sets of feature values for which the correct predictions ("actuals") are known, the output predictions P1, P2, etc. may be used to train the model 10 so that future predictions are more accurate. In an unrestricted environment, training the model 10 in this way may involve a straightforward comparison of a given prediction "P" with the known actual "A" to determine a residual "R" representing the accuracy of the prediction (e.g., R=P−A). However, in many real-world scenarios, the actuals, while known or knowable in principle, cannot practically be accessed by the computer system used to train the model 10. Unlike conventional machine learning systems, the disclosed system 100 may advantageously overcome this difficulty by training the model 10 on the basis of proxies in place of the actuals.

FIG. 1 illustrates a restricted environment as described above, in which one or more computers 110 is responsible for training the model 10 while a separate, distinct one or more computers 120, remote from the computer(s) 110, has access to the actuals. This scenario may arise in a case where the computer(s) 110 are under the control of a first entity and the computer(s) 120 are under the control of a second entity, for example (e.g., with the actuals being behind a firewall). In one contemplated application, the computer(s) 110 may be controlled by an analyst or other entity that wants to make predictions on the basis of commercial sales data, while the computer(s) 120 are controlled by the original collectors of the sales data (e.g., retailers) and/or their contracted affiliates (e.g., brand owners whose products are sold by retailers). In such an environment, computer(s) 110 may be unable to access the sales data representing the actuals due to the business interests and/or contractual obligations of the parties who possess it. In other contemplated applications, the actuals may be inaccessible due to privacy concerns (e.g., in the case of healthcare data) or any other legal or regulatory constraint or may be inaccessible due to technical constraints that entail some loss of fidelity in the actuals before they get to the computer(s) 110 (e.g., low-resolution or incomplete data sampling, lossy data compression, etc.). As described in more detail below, the disclosed system 100 may in such cases use the low-resolution, incomplete, approximate, or otherwise degraded data as proxies for the inaccessible actuals.

Figure 2:
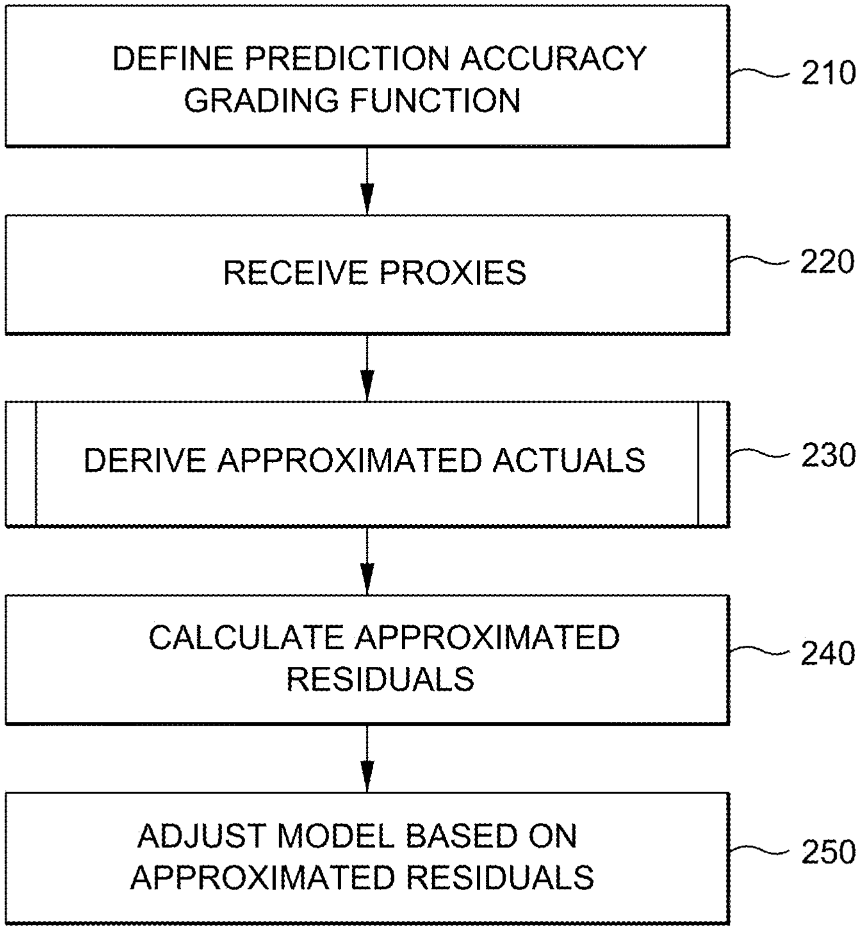
FIG. 2 shows an example operational flow in accordance with various embodiments of the disclosed subject matter.

Referring to FIG. 2, an example operational flow in accordance with various embodiments of the disclosed subject matter may begin with defining a prediction accuracy grading function (step 210). Given a prediction of the model 10 and its corresponding actual, a prediction accuracy may be derived that represents how accurate the prediction was. An example of a prediction accuracy may be the difference between the prediction and the actual, e.g., P−A, equivalent to a residual, or a percentage difference between the prediction and the actual, e.g., (P−A)/A or (P−A)/(0.5(P+A)) or (P−A)/max(P,A). The prediction accuracy grading function may map prediction accuracies to proxies and, advantageously may be a many-to-one function such that each resulting proxy represents a range of possible prediction accuracies (and thus the proxies do not reveal the exact values of the prediction accuracies or actuals). The proxies may thus effectively represent buckets, with each possible prediction accuracy being assigned to a respective bucket. An example of a prediction accuracy grading function is shown below in Table 1 for a case where prediction accuracies are defined so as to necessarily fall between −1 and 1 as will occur when the prediction accuracies are calculated as a percentage difference (P−A)/(max(P,A)):

TABLE 1

| Prediction Accuracy Range | Grade |
|---|---|
| −0.999 to −0.990 | I− |
| −0.990 to −0.950 | H− |
| −0.950 to −0.900 | G− |
| −0.900 to −0.850 | F− |
| −0.850 to −0.750 | E− |
| −0.750 to −0.500 | D− |
| −0.500 to −0.200 | C− |
| −0.200 to −0.050 | B− |
| −0.050 to 0.000 | A− |
| 0.000 to 0.050 | A+ |
| 0.050 to 0.200 | B+ |
| 0.200 to 0.500 | C+ |
| 0.500 to 0.750 | D+ |
| 0.750 to 0.850 | E+ |
| 0.850 to 0.900 | F+ |
| 0.900 to 0.950 | G+ |
| 0.950 to 0.990 | H+ |
| 0.990 to 0.999 | I+ |

In the example of Table 1, the proxies output by the prediction accuracy grading function are in the form of letter grades A to I with "better" grades (i.e., closer to A) representing better prediction accuracy and with the positive/negative indicators +/− denoting whether the prediction was too high or two low relative to the actual (i.e., whether the percentage difference was positive or negative). As can be seen, the size of each bucket need not necessarily be the same. The prediction accuracy grading function may be a piecewise function that simply maps arbitrarily defined ranges of prediction accuracy to proxies as shown. Referring back to FIG. 1, the one or more computers 110 may define the prediction accuracy grading function by storing the prediction accuracy grading function in one or more databases 130, along with any associated definition of prediction accuracy.

The operational flow of FIG. 2 may continue with receiving a plurality of proxies corresponding respectively to a plurality of predictions P1, P2, etc. of the model 10 (step 220). Because the computer(s) 110 may not have access to the actuals for various reasons as discussed above, it is contemplated that the computer(s) 120 may generate the proxies and provide them to the computer(s) 110 as shown in FIG. 1. For example, the computer(s) 110 may provide a tool such as worksheet 140 to the computer(s) 120 (e.g., over a network such as the Internet). The worksheet 140 may be a spreadsheet such as an Excel worksheet that includes the predictions P1, P2, etc. along with the prediction accuracy grading function (which may be included in the cells of the spreadsheet as a formula) and any helpful formulas for deriving the prediction accuracies to be input to the prediction accuracy grading function. A user of the computer(s) 120 may simply input the corresponding actual for each prediction P1, P2, etc. included in the spreadsheet. (The relevant actual to be input may be readily identified by one or more corresponding features or other identifying information associated with each prediction, such as a product number and a date in a case where the actuals represent sales of the product). The worksheet 140 may then automatically calculate the proxies using the prediction accuracy grading function. Advantageously, entry into the worksheet 140 and all processing associated with calculating the proxies may be done by the computer(s) 120 without any communication with the computer(s) 110, thus ensuring that the computer(s) 110 do not see the actuals. With the proxies having been calculated, the actuals may be deleted from the worksheet 140 (or a file may otherwise be exported that omits the actuals), leaving only the proxies A−, D+, etc., which may be returned to the computer(s) 110 in association with the respective predictions P1, P2, etc. as represented in FIG. 1 by the returned worksheet 140. Other modalities by which the computer(s) 120 may calculate the proxies and return them to the computer(s) 110 without revealing the actuals are contemplated as well, such as a web application or an application programming interface (API).

Figure 3:
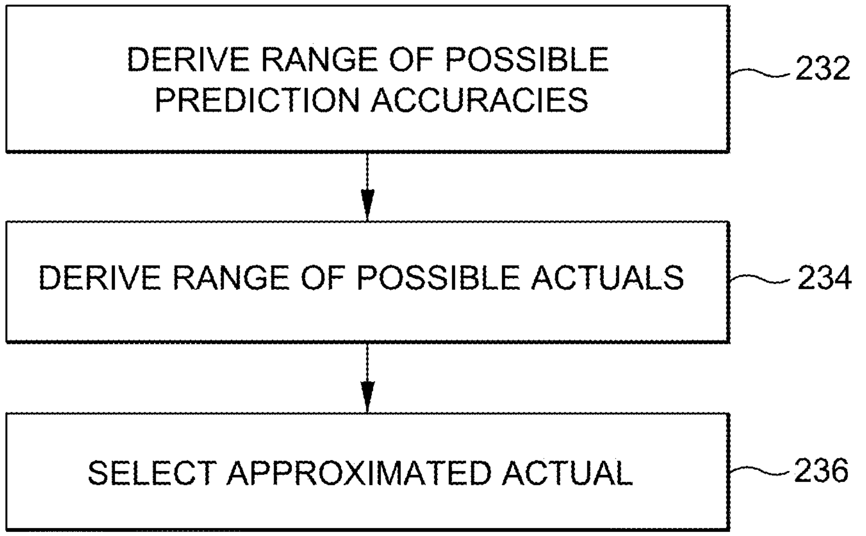
FIG. 3 shows an example sub-operational flow of step 230 in FIG. 2.

The operational flow of FIG. 2 may continue with deriving, for each of the plurality of proxies, a corresponding approximated actual according to the prediction accuracy grading function (step 230). This may be done by applying the prediction accuracy grading function and any associated calculations (e.g., calculation of the prediction accuracy) in reverse. Referring to FIG. 3, one possible sub-operational flow of step 230 may begin with deriving a range of possible prediction accuracies from the proxies. For example, the computer(s) 110 may refer to the prediction accuracy grading function stored in the database(s) 130 to convert each letter grade to a corresponding range of prediction accuracies. The prediction accuracy grading function may be embodied in a lookup table as exemplified by Table 1, for example. The sub-operational flow may then continue with deriving a range of possible actuals corresponding to each range of prediction accuracies (step 234). For example, in a case where positive/negative indicators +/− on the proxies are used to denote whether the prediction was too high or two low relative to the actual (i.e., whether the percentage difference was positive or negative), the formula (P−A)/(max (P,A)) may be applied accordingly. Namely, for a letter grade with a "+" sign, the prediction P may be inserted in place of max (P,A), whereas for a letter grade with a "−" sign, the unknown actual A may be inserted in place of max (P,A). So, for example, in the case of the letter grade "A−" in the above Table 1, after deriving the range −0.050 to 0.000 in step 232, the computer(s) 110 may input the corresponding model prediction P to derive a range of possible actuals in step 234. Assuming, for the sake of example, that the prediction P output by the model 10 is equal to 16,685, the lower bound of the range of possible actuals may be calculated by solving (P−A)/A=0.000 for A, resulting in $A_{min}$=16,685, and the upper bound of the range of possible actuals may be calculated by solving (P−A)/A=−0.050 for A, resulting in $A_{max}$=17,563. It can thus be derived from the proxy "A-" that the actual must have fallen somewhere within the range of 16,685 to 17,563. The example sub-operational flow of FIG. 3 may conclude with selecting an approximated actual A* from within this range (step 236). As one example, the computer(s) 110 may choose the mean or midpoint of the range, e.g., 17,124.

Referring back to FIG. 2, the derived approximated actuals may then be used to calculate approximated residuals (step 240). In particular, for each of the plurality of predictions of the model P1, P2, etc., the computer(s) 110 may calculate an approximated residual R* based on the corresponding approximated actual A*, for example, as R*=P−A*. This approximate residual may represent an educated guess, based on the proxy, at what the residual might have been between the prediction of the model 10 and the unknown true actual. The operational flow may then conclude with adjusting the model 10 based on the approximated residuals A* (step 250). The adjustment to the model 10 may entail the adjustment of parameters depending on the particular machine learning architecture, for example, by fitting a decision tree to the approximated residuals A* in the case of a boosted tree regression model 10.

Figure 4A:
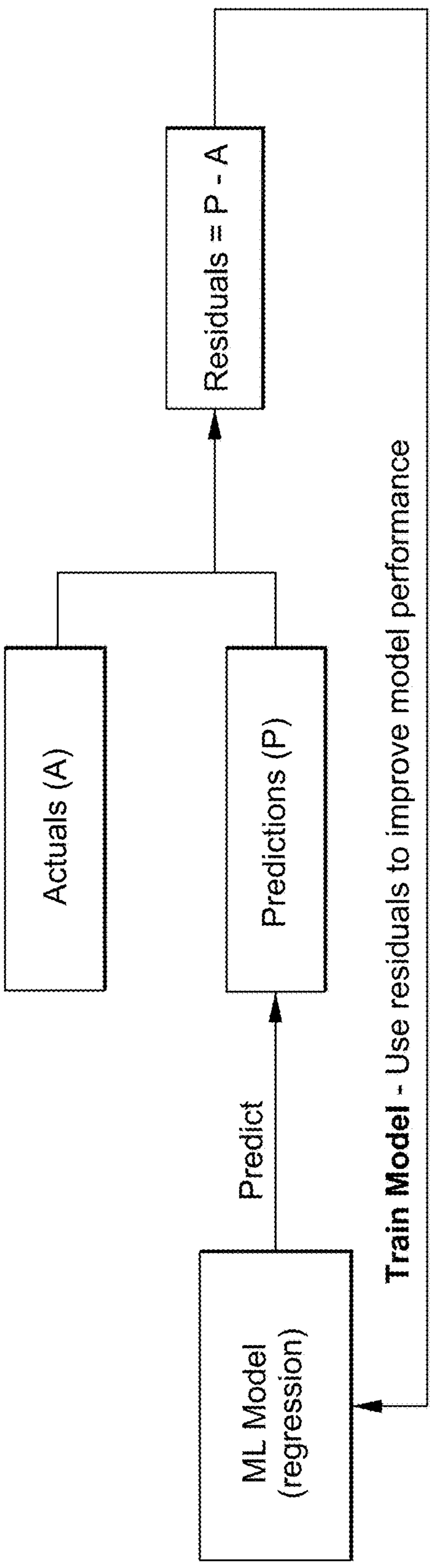
FIG. 4A shows an example flow chart in accordance with various embodiments of the disclosed subject matter.
Figure 4B:
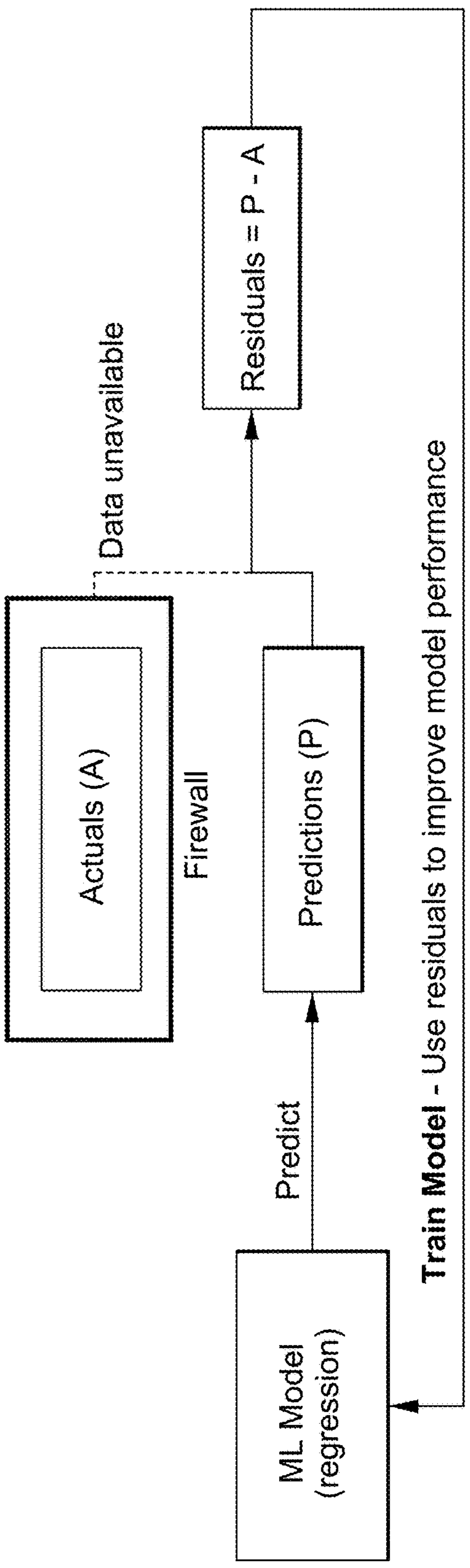
FIG. 4B shows another example flow chart in accordance with various embodiments of the disclosed subject matter.
Figure 4C:
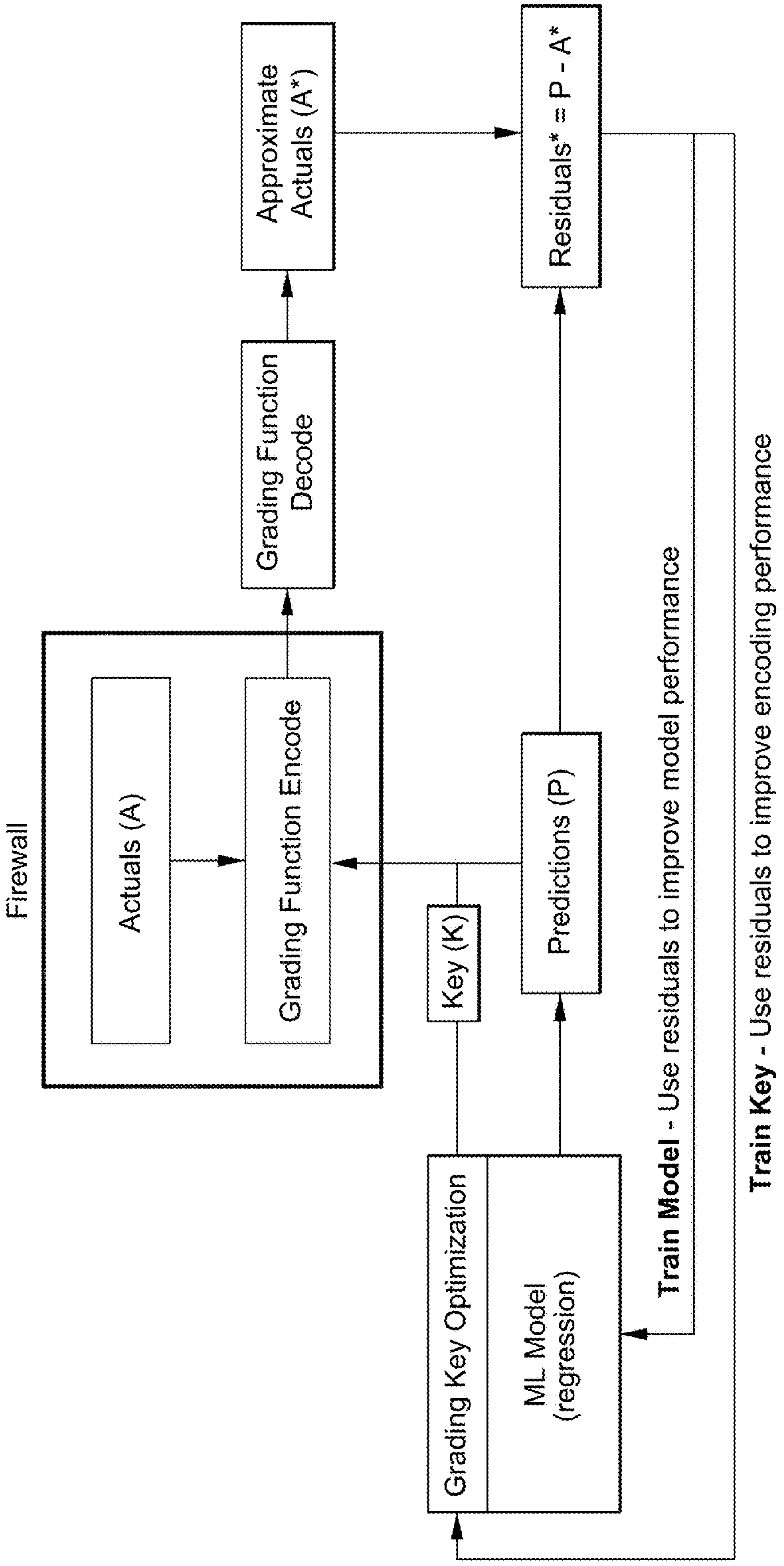
FIG. 4C shows another example flow chart in accordance with various embodiments of the disclosed subject matter.

FIGS. 4A-4C show example flow charts in accordance with various embodiments of the disclosed subject matter. As represented in FIG. 4A, traditional machine learning based regression models require the application of truth set data ("actuals") for training an algorithm and increasing predictive accuracy ("training data"). Yet, as represented in FIG. 4B, some environments for the application of machine learning may implicate a technical, regulatory or legal constraint that requires a "firewall" that prohibits the availability of actuals as a feedback loop for algorithm training. In an environment where a firewall of any type prohibits access to an actual, but where it may be possible to extract a degraded signal as a proxy value for the actual, the disclosed embodiments illustrated that it is possible to encode one or more actuals via the described prediction accuracy grading system, such that the firewall's technical, regulatory or legal constraints are maintained while the machine learning algorithms are able to decode the graded data and generate effective training data while minimizing the loss of fidelity from the originating actuals.

In general, it can be appreciated that the firewall constraints on the transmission of actuals may result in one or more of the following constraints on the proxy values:

- Accuracy (%): By definition, actuals have an accuracy of 100% (perfect fidelity), while the firewall constraint may allow the proxy values to be represented with a degraded accuracy value such as 95% (typically expressed as +/−2.5%), 90% (+/−5%), or any other accuracy percentage.
- Buckets (count): The firewall constraint may allow the proxy value to be counted within one of n buckets. For example, a set of predictions might range in numeric value from 1 to 99, whereby the proxy values returned through the firewall may be grouped into three buckets, with ranges of 1-33, 34-66, and 67-99.
- Direction (positive, negative): The firewall constraint may allow the proxy value to indicate whether the predicted value is higher (positive) or lower (negative) than the actual. For example, a prediction of 50 for an actual of 40 would have a +10 residual graded as positive, while a prediction of 30 for an actual of 40 would have a −10 residual graded as negative.
- Combinatorial constraints: Any of the constraints may be combined in the definition of the firewall. For example, a legal constraint on data sharing may limit Accuracy to +/−5%, with up to 6 buckets, and directionality.

Aspects of the techniques described herein may be represented by the multi-step process illustrated in FIG. 4C, in relation to which the following steps and considerations are contemplated:

1. The machine learning process is utilized to generate real-value predictions.
2. The set of prediction values are transmitted across the firewall along with a prediction accuracy grading function and, in some cases, an accompanying Grading Key ("Key"). The Key is the ruleset by which the grading function transforms an actual into a proxy and may include, for example, a definition of prediction accuracy as described herein. The Key may be embodied in the worksheet 140 described above, for example.

3. Behind the firewall, the set of prediction values are compared with the set of actuals using the prediction grading function and Key.
4. The output of the grading function is a set of encoded proxy values that fulfills the firewall's compliance requirements and minimizes loss of fidelity within the constraints of the firewall's compliance requirements. Key encoding may be parameterized by: x % accuracy and number of buckets and may include direction.
5. The proxy value(s) are transmitted across the firewall in the encoded format.
6. The proxy value(s) are received and decoded by the machine learning algorithm in such a way as to minimize loss of fidelity and persist awareness of the encoding mechanism applied to the actual. Decoding and Key optimization may be informed by trial and error, where decoder selects the Calibration Parameters based on the value that minimizes residual*, and Partition=where boundaries of buckets are placed.
7. The decoded proxy value(s) are applied as training data to the machine learning prediction process.
8. In the next iteration of the machine learning process, the overall encoding mechanism is evaluated for accuracy, and the Key and/or grading function is updated, if needed. This may be done, for example, if too many prediction accuracies are mapped to the same proxy, suggesting that the ranges of values corresponding to each proxy may need to be adjusted.
9. The process repeats.

In general, it is contemplated that the definition of the prediction accuracy grading function, including, for example, the assignment of prediction accuracy values to buckets, may be optimized in view of the particular constraints of a given deployment of the disclosed system 100. For instance, in a case where legal, regulatory, and/or technical constraints mandate a maximum accuracy (e.g., accuracy of no greater than 90% or +/−5% i.e. x=0.05), it may be critical that the grading function have low resolution for predictions that are near the actuals, (e.g., within 5% of the actuals). This may be reflected in the choice of larger bucket sizes for more accurate predictions. Referring to Table 1, for example, such a +/−5% constraint is met by the A− and A+ ranges of −0.050 to 0.000 and 0.000 to 0.050, respectively, assuming that directionality (i.e., positive/negative indicators like "+" and "−") is allowed by the constraints. Meanwhile, for predictions that are far from the actuals, such as the H and I grades, it may be permissible for the resolution to be much greater, allowing for smaller buckets (e.g., −0.999 to −0.990 for I− and 0.990 to 0.999 for I+). From the perspective of the entity that is interested in protecting the data, the high resolution of these smaller buckets may be of no concern. On the other hand, from the perspective of the entity training the model 10, it may counterintuitively be the case that the training efficiency benefits greatly from high resolution evaluation of these far-from-accurate predictions. That is, the difference between a prediction's being 10,000 percent and 20,000 percent away from the actual may not be meaningful to the owner of the data but may be extremely significant for improving the performance of the model 10. The nature of the constraints may thus inform how the prediction accuracy grading function is to be defined for a given application. This approach exploits the fact that, while constraints on the machine learning model may typically only set out an initial threshold limit, the way machine learning models get better is often by identifying improvements based on where the model has the largest deviations. Hence, this approach, while meeting the constraints, may place greatest importance on the largest prediction errors (i.e., the largest residuals) to dramatically improve the machine learning model's performance.

The prediction accuracy grading function may also be defined or modified to reflect a required number of buckets and/or a desired impression of the grading scheme in the eyes of the data owner in order to nominally meet a particular set of firewall constraints, such as the following:

Accuracy: 90% (x=0.05)
Buckets: 6
Direction: Allowed

For example, if directionality is considered separately from the number of buckets, then the same grading function represented by Table 1 may be recast so as to simulate a simple A to F grading scheme and meet the above requirements as shown in Table 2 below:

TABLE 2

| Prediction Accuracy Range | | |
|---|---|---|
| Min | Max | Grade |
| −0.999 | −0.990 | F− |
| −0.990 | −0.950 | F |
| −0.950 | −0.900 | E− |
| −0.900 | −0.850 | D− |
| −0.850 | −0.750 | D |
| −0.750 | −0.500 | C− |
| −0.500 | −0.200 | B− |
| −0.200 | −0.050 | B |
| −0.050 | 0.000 | A− |
| 0.000 | 0.050 | A+ |
| 0.050 | 0.200 | A |
| 0.200 | 0.500 | B+ |
| 0.500 | 0.750 | C+ |
| 0.750 | 0.850 | C |
| 0.850 | 0.900 | D+ |
| 0.900 | 0.950 | E+ |
| 0.950 | 0.990 | E |
| 0.990 | 0.999 | F+ |

Based on the above grading function, a grading key (which may be embodied in the worksheet 140, for example), may provide the formula by which to score a prediction based on its corresponding actual, thereby determining bucket placement (e.g., (prediction-actual)/max (set of actuals)) and further may provide the distribution-optimized buckets as represented by Table 2, above. Sample results from a grading function encode (e.g., performed by the remote computer(s) 120) may be as shown in the following Table 3.

TABLE 3

| Actuals | Predictions | Prediction Accuracy | Encoded Grade |
|---|---|---|---|
| 65 | 16 | −0.76 | D |
| 45 | 274 | 0.84 | C |
| 30 | 328 | 0.91 | E+ |
| 16 | 161 | 0.90 | E+ |
| 12 | 26 | 0.54 | C+ |
| 13 | 2 | −0.85 | D |
| 11 | 211 | 0.95 | E+ |
| 2300 | 2372 | 0.03 | A+ |

TABLE 3-continued

| Actuals | Predictions | Prediction Accuracy | Encoded Grade |
|---|---|---|---|
| 15 | 22 | 0.33 | B+ |
| 11 | 2 | −0.82 | D |
| 5 | 2 | −0.60 | C− |
| 17000 | 16685 | −0.02 | A− |
| 12 | 2 | −0.83 | D |
| 7 | 7 | −0.07 | B |
| 18 | 18 | 0.01 | A+ |
| 9 | 2 | −0.78 | D |

The various functionality and processes described herein in relation to the system 100 of FIG. 1, the operational flows of FIGS. 2 and 3, and the flow charts of FIGS. 4A-4C, as well as in some cases the machine learning regression model 10 itself, may, in whole or in part, be embodied in a computer program product that may reside within or otherwise communicate with the computer(s) 110, 120 and/or database(s) 130 of the system 100. The various servers, interfaces, systems, databases, agents, peers, engines, controllers, or other types of computing devices that may make up the computer(s) 110, 120 and/or database(s) 130 of the system 100 may exchange data using standardized protocols or algorithms including, for example, HTTP, HTTPS, AES, public-private key exchanges, web service APIs, known financial transaction protocols, or other electronic information exchanging methods. Data exchanges may be conducted over a packet-switched network, the Internet, LAN, WAN, VPN, etc. The computer program product may comprise one or more non-transitory program storage media (e.g., hard drive, FPGA, PLA, solid state drive, RAM, flash, ROM, etc.), that store computer programs or other instructions executable by one or more processors (e.g., a CPU or GPU) or programmable circuits to perform operations in accordance with the various embodiments of the present disclosure. The one or more non-transitory program storage media may in some cases reside external to the computer(s) 110, 120, and/or database(s) 130 of the system 100 such as in a cloud infrastructure (e.g., Amazon Web Services, Azure by Microsoft, Google Cloud, etc.) and/or a server system accessible via a network such as the Internet, with the computer programs or other instructions being provided to the computer(s) 110, 120, and/or database(s) 130 over the network. Examples of program instructions stored on a computer-readable medium may include, in addition to code executable by a processor, state information for execution by programmable circuitry such as a field-programmable gate arrays (FPGA) or programmable logic array (PLA).

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of training a machine learning regression model, the method comprising:

defining a prediction accuracy grading function, the prediction accuracy grading function being a many-to-one function that maps prediction accuracies to proxies, each of the prediction accuracies being derivable from a respective prediction of the model and a corresponding actual;

receiving a plurality of proxies corresponding respectively to a plurality of predictions of the model;

for each of the plurality of proxies, deriving a corresponding approximated actual according to the prediction accuracy grading function;

for each of the plurality of predictions of the model, calculating an approximated residual based on the corresponding approximated actual; and adjusting the model based on the approximated residuals;

wherein the prediction accuracy grading function maps a first number of prediction accuracies to a first one of the proxies and a second number of prediction accuracies to a second one of the proxies, the first number being greater than the second number;

wherein the prediction accuracies that are mapped by the prediction accuracy grading function to the first one of the proxies fall within a first range of prediction accuracies, and the prediction accuracies that are mapped by the prediction accuracy grading function to the second one of the proxies fall within a second range of prediction accuracies that is non-overlapping with the first range;

wherein the prediction accuracies falling within the first range are derived from predictions of the model that are closer to the corresponding actuals than the prediction accuracies falling within the second range.

2. The method of claim 1, wherein each of the prediction accuracies is calculated as a percentage difference between the respective prediction of the model and the corresponding actual.

3. The method of claim 1, wherein each of the proxies indicates whether the respective prediction of the model is higher or lower than the corresponding actual.

4. The method of claim 1, further comprising providing a worksheet for deriving the proxies based on predictions of the model included in the worksheet and the corresponding actuals.

5. The method of claim 4, wherein the worksheet comprises one or more formulas for deriving the prediction accuracies from the respective predictions of the model and the corresponding actuals.

6. A computer program product comprising one or more non-transitory program storage media on which are stored instructions executable by one or more processors or programmable circuits to perform operations for training a machine learning regression model, the operations comprising:

defining a prediction accuracy grading function, the prediction accuracy grading function being a many-to-one function that maps prediction accuracies to proxies, each of the prediction accuracies being derivable from a respective prediction of the model and a corresponding actual;

receiving a plurality of proxies corresponding respectively to a plurality of predictions of the model;

for each of the plurality of proxies, deriving a corresponding approximated actual according to the prediction accuracy grading function;

for each of the plurality of predictions of the model, calculating an approximated residual based on the corresponding approximated actual; and adjusting the model based on the approximated residuals;

wherein the prediction accuracy grading function maps a first number of prediction accuracies to a first one of the proxies and a second number of prediction accuracies to a second one of the proxies, the first number being greater than the second number;

wherein the prediction accuracies that are mapped by the prediction accuracy grading function to the first one of the proxies fall within a first range of prediction accuracies, and the prediction accuracies that are mapped by the prediction accuracy grading function to the second one of the proxies fall within a second range of prediction accuracies that is non-overlapping with the first range;

wherein the prediction accuracies falling within the first range are derived from predictions of the model that are closer to the corresponding actuals than the prediction accuracies falling within the second range.

7. The computer program product of claim 6, wherein each of the prediction accuracies is calculated as a percentage difference between the respective prediction of the model and the corresponding actual.

8. The computer program product of claim 6, wherein each of the proxies indicates whether the respective prediction of the model is higher or lower than the corresponding actual.

9. The computer program product of claim 6, wherein the operations further comprise providing a worksheet for deriving the proxies based on predictions of the model included in the worksheet and the corresponding actuals.

10. The computer program product of claim 9, wherein the worksheet comprises one or more formulas for deriving the prediction accuracies from the respective predictions of the model and the corresponding actuals.

11. A system for training a machine learning regression model, the system comprising:

one or more databases for storing a prediction accuracy grading function, the prediction accuracy grading function being a many-to-one function that maps prediction accuracies to proxies, each of the prediction accuracies being derivable from a respective prediction of the model and a corresponding actual; and one or more computers operable to receive a plurality of proxies corresponding respectively to a plurality of predictions of the model and, for each of the plurality of proxies, derive a corresponding approximated actual according to the prediction accuracy grading function, the one or more computers being further operable to calculate an approximated residual for each of the plurality of predictions of the model based on the corresponding approximated actual and to adjust the model based on the approximated residuals;

wherein the prediction accuracy grading function maps a first number of prediction accuracies to a first one of the proxies and a second number of prediction accuracies to a second one of the proxies, the first number being greater than the second number;

wherein the prediction accuracies that are mapped by the prediction accuracy grading function to the first one of the proxies fall within a first range of prediction accuracies, and the prediction accuracies that are mapped by the prediction accuracy grading function to the second one of the proxies fall within a second range of prediction accuracies that is non-overlapping with the first range;

wherein the prediction accuracies falling within the first range are derived from predictions of the model that are closer to the corresponding actuals than the prediction accuracies falling within the second range.

12. The system of claim 11, further comprising one or more remote computers operable to receive the plurality of predictions of the model and a corresponding plurality of actuals, derive prediction accuracies from the predictions and the actuals, and map the prediction accuracies to proxies according to the prediction accuracy grading function to generate the plurality of proxies.

13. The system of claim 12, wherein the one or more remote computers receive, from the one or more computers, a worksheet for deriving the plurality of proxies based on the plurality of predictions of the model and the corresponding plurality of actuals.

14. The system of claim 13, wherein the worksheet comprises one or more formulas for deriving the prediction accuracies from the predictions and the actuals.

* * * * *